United States Patent [19]
Patmore et al.

[11] Patent Number: 5,813,449
[45] Date of Patent: Sep. 29, 1998

[54] VEHICLE SECURITY SHADE WITH TELESCOPING END PIECES

[75] Inventors: Kevin M. Patmore, Northville; Jeffrey A. Price, Lakeville; Michael C. Trombley, Sterling Heights, all of Mich.

[73] Assignee: Irvin Automotive Products, Inc., Auburn Hills, Mich.

[21] Appl. No.: 820,603

[22] Filed: Mar. 19, 1997

[51] Int. Cl.⁶ ...................................................... A47H 1/00
[52] U.S. Cl. ................................ 160/370.22; 160/323.1; 160/24; 296/37.16
[58] Field of Search ..................... 160/23.1, 24, 370.22, 160/323.1, 324; 296/37.16, 143, 97.8

[56] References Cited

U.S. PATENT DOCUMENTS

| | | | |
|---|---|---|---|
| 2,605,987 | 8/1952 | Brown et al. | 248/408 |
| 3,327,985 | 6/1967 | Levit et al. | 248/408 |
| 4,168,094 | 9/1979 | Yagi . | |
| 4,220,367 | 9/1980 | Gale et al. | 160/323.1 X |
| 4,399,857 | 8/1983 | Horma . | |
| 4,668,001 | 5/1987 | Okumura . | |
| 4,671,557 | 6/1987 | Lemp . | |
| 4,781,234 | 11/1988 | Okumura et al. . | |
| 5,224,748 | 7/1993 | Decker et al. . | |
| 5,226,467 | 7/1993 | Lii | 160/370.22 X |
| 5,464,052 | 11/1995 | Wieczorek et al. . | |

*Primary Examiner*—Blair Johnson
*Attorney, Agent, or Firm*—Harness, Dickey & Pierce, P.L.C.

[57] ABSTRACT

A vehicle security shade adapted for use within the interior compartment of a motor vehicle and having a shade which can be extended to enclose the vehicle compartment area. The shade assembly is removably attached to the motor vehicle interior by using one or more end piece assemblies having a telescoping end piece. The end piece is biased to an outer position through the use of a compression spring. The end piece engages with a socket or other mounting feature of the motor vehicle interior trim. The axially moveable end piece includes a blocking means which allows the end piece to move under the influence of the compression spring to its outer position but is blocked from returning from its inner position until an actuator is manually operated. The positive mechanical blocking of inward movement of the end piece is provided at a plurality of relative extended positions of the end piece.

11 Claims, 2 Drawing Sheets

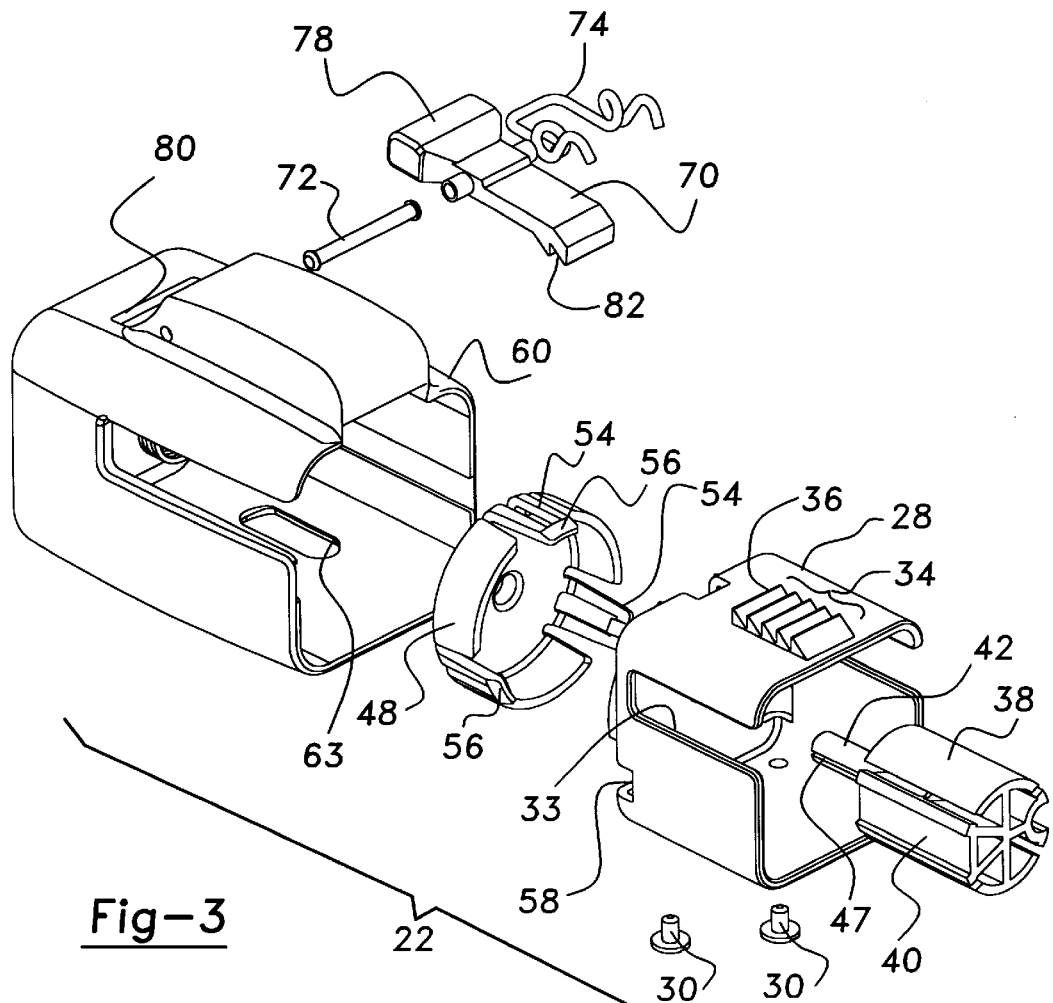
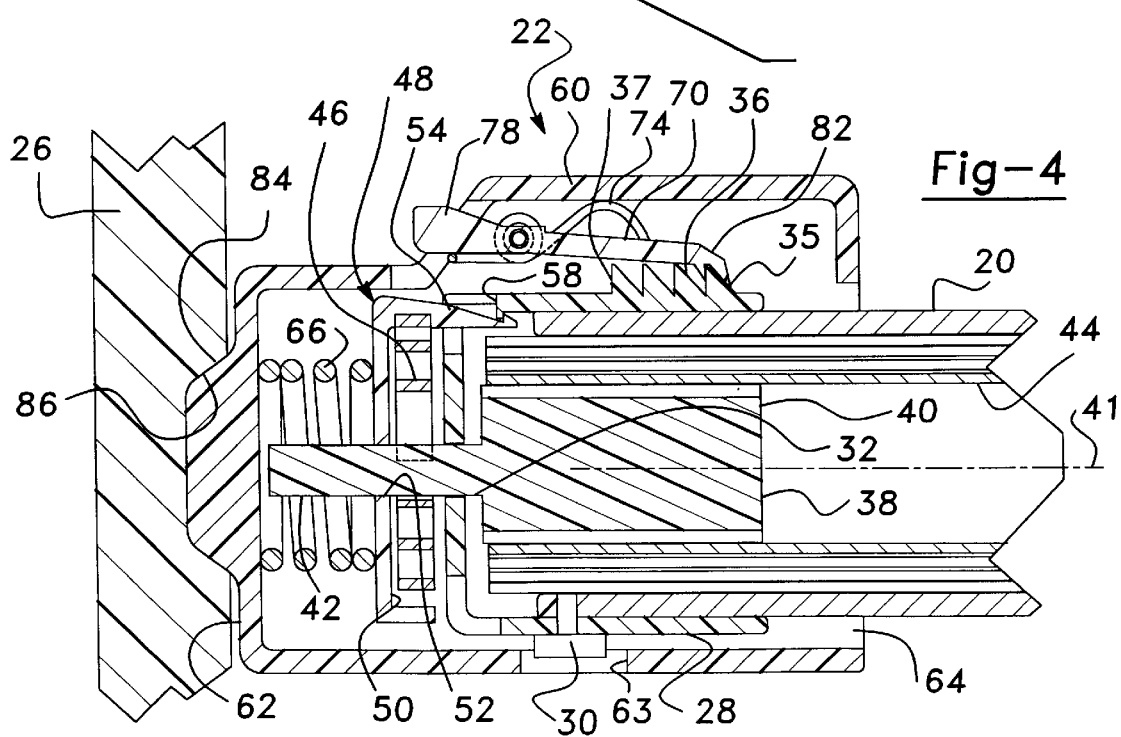
Fig-3
Fig-4

VEHICLE SECURITY SHADE WITH TELESCOPING END PIECES

BACKGROUND OF THE INVENTION

This invention is related to a motor vehicle accessory device and particularly, to a removable security shade assembly for a motor vehicle interior compartment area.

In many styles of present motor vehicles, an interior rear compartment area is available for storing articles which can be viewed from outside the vehicle. For example, sport utility vehicles, station wagons, and hatch back type vehicles may have such a compartment area. For these vehicles, motor vehicle manufacturers frequently offer a security shade device. These devices typically comprise a shade panel of a flexible sheet material which is wrapped on a torsionally biased roll tube. The shade can be extended in a horizontal direction to cover the rear compartment area when it is desired to hide articles from exterior view. The shade can be retracted when there is a need for access to the rear compartment area. In order to enhance versatility, security shade assemblies are generally removably attached to the vehicle. This allows an unobstructed compartment area. Examples, of such devices can be had with references to U.S. Pat. Nos. 5,464,052 and 5,224,748 which are hereby incorporated by reference.

Designers of security shade assemblies are constantly striving to improve them in terms of ease of assembly, cost, reliability, ease of use by the vehicle owner, and the integrity of their mounting in the vehicle.

There is inevitably some vehicle-to-vehicle variability in the interior dimensions of a finished vehicle. Therefore, a security shade assembly which is mounted laterally between the rear quarter trim panels of the vehicle, and having a shade panel which extends in a rear direction must accommodate such cross-body tolerance variations. Therefore, it is necessary to provide some dimensional flexibility in the security shade assembly. This can be accomplished by providing the shade assembly with telescoping end pieces which are spring biased to allow the ends of the security shade to extend to various distances to engage mounting sockets or other features in the interior trim panels.

In accordance with this invention, a vehicle security shade assembly is provided which accommodates side-to-side build variations in a vehicle while also providing a secure mounting to the vehicle. These features are provided through the use of a vehicle security shade assembly having one or more end piece assemblies having a telescoping sleeve which is spring biased to an outer position (i.e. away from the other end). The end piece assembly further features a latching or clutch arrangement which locks the telescoping end piece in position when it is mounted in the vehicle. This latching enables the telescoping end piece to be blocked from retraction at a number of axial extended positions so that the unit is securely locked in position over a range of possible cross-body dimensions.

Further objects, features and advantages of the invention will become apparent from a consideration of the following description and the appended claims when taken in connection with the accompanying drawings.

BRIEF DESCRIPTION OF THE DRAWINGS

FIG. 3 is an exploded pictorial view of the end piece assembly shown in FIG. 2.

FIG. 4 is a longitudinal cross-sectional view taken along line 4—4 from FIG. 1.

DETAILED DESCRIPTION OF THE PREFERRED EMBODIMENT

Figure 1:
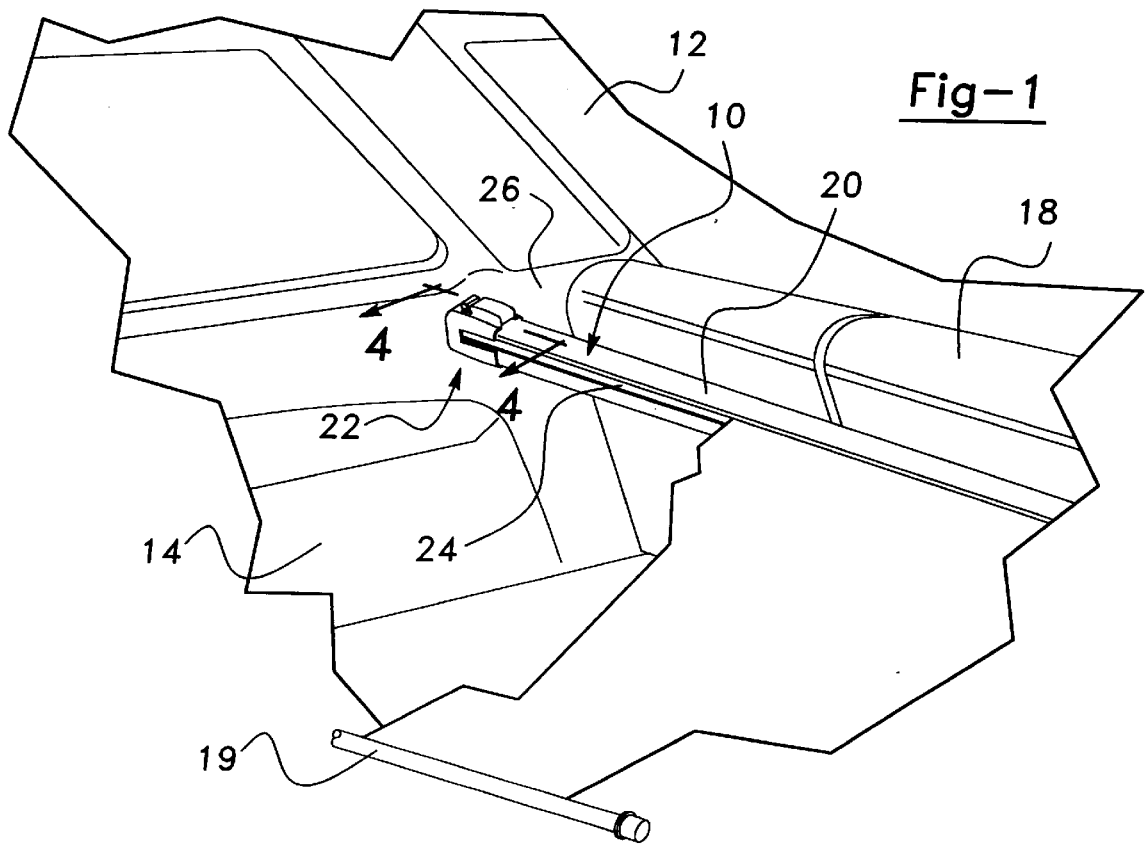
FIG. 1 is a pictorial view of a rear compartment area of a motor vehicle showing a vehicle security shade assembly in accordance with this invention.

With reference to FIG. 1 a vehicle security shade assembly 10 is shown in accordance with this invention mounted within motor vehicle 12. FIG. 1 particularly shows the interior rear compartment area 14 of the vehicle. Vehicle security shade assembly 10 is mounted to traverse the rear compartment area 14 in a lateral direction and is mounted just behind the seat backs 18 of the second set of vehicle passenger seats. In other styles of vehicles, the shade assembly could be mounted directly behind the driver's seat. The vehicle security shade assembly of the present invention could also be implemented in a shade mounted in the fore-and-aft direction in which the shade panel would be extended and retracted in the cross-body (lateral) direction.

FIG. 1 further illustrates shade 16 being extended from the shade assembly 10 in a rearward direction. Shade 16 is made of a woven or non-woven flexible sheet material which is opaque, flexible, and can comply with the numerous design and performance requirements applicable to vehicle interior trim components. A pull tube 19 (shown partially) is attached to the rearward edge of shade 16 and is used to extend the shade in a rearward direction. The pull tube can be in the form of a hollow cylindrical tube as shown, a flat panel or other constructions. The pull tube 19 is removably mounted to a socket or other receiver within the interior compartment area (not shown). An example of a pull tube and receiver suitable for use in connection with this invention can be obtained with reference to the above referenced issued U.S. patents.

Shade assembly 10 includes a hollow housing 20 preferably made of formed sheet metal having end piece assembly 22 mounted to one end thereof. Housing 20 has a generally square or rectangular cross-sectional configuration. An identical end piece assembly 22 may be provided at the opposite axial end of housing 20. In an assembled condition, housing 20 and end piece assembly 22 form shade slot 24 which allows the shade 16 to be withdrawn from and retracted into the shade assembly. End piece assembly 22 is mounted to a depression or socket described in more detail below within rear quarter compartment trim panel 26.

Figure 2:
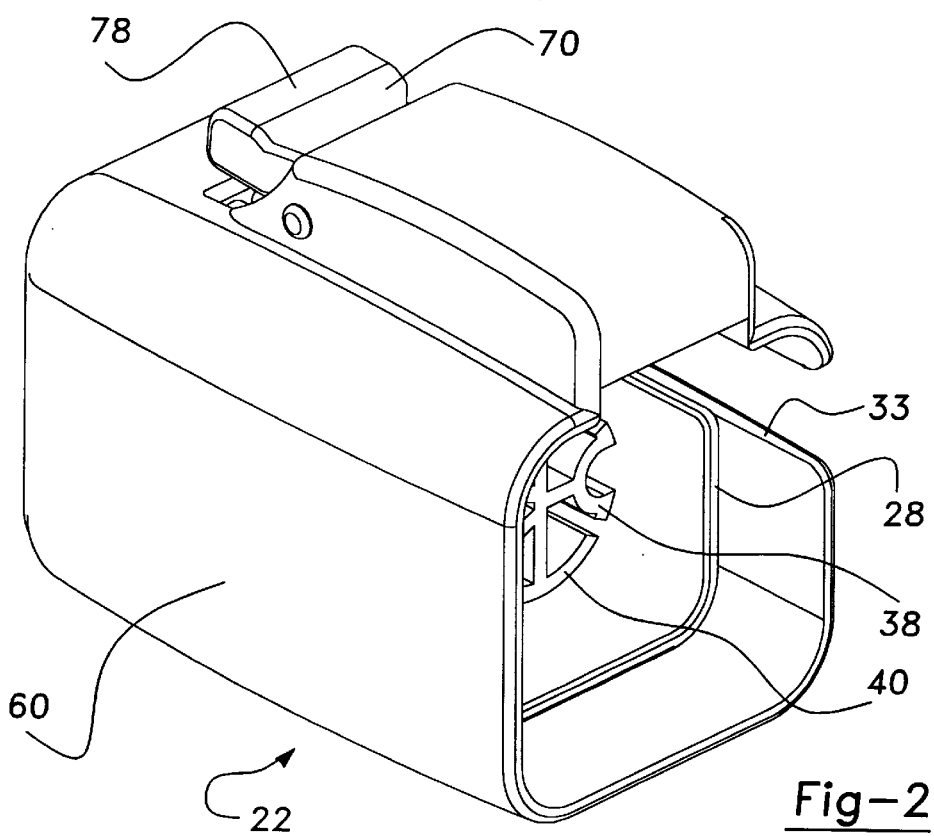
FIG. 2 is a pictorial view of the end piece assembly at one end of the device.

End piece assembly 22 is best described with reference to FIGS. 2, 3 and 4. Inner sleeve 28 is preferably made of a molded polymeric plastic material and closely receives housing 20. Rivets 30 or other mechanical fasteners are installed to rigidly attach inner sleeve 28 to housing 20. Inner sleeve 28 further defines a closed end having central bore 32. Slot 33 provides for passage of shade 16. One of the outer surfaces of inner sleeve 28 forms rack 34 having a plurality of teeth 36. Teeth 36 are oriented such that the inner surfaces 35 (the surfaces oriented toward the lateral centerline of shade assembly) are ramped whereas the outer surfaces 37 are perpendicular to the longitudinal axis of the assembly. Thus, rack 34 has a "saw tooth" profile.

Roll tube bearing axle 38 is also preferably made from molding a polymeric material and forms a central spool 40 with a projecting axle post 42. Roll tube bearing axle 38 receives roll tube 44 which is an elongated hollow cylinder preferably made of rolled and seamed sheet metal. One means of manufacturing roll tube 44 is to provide it with an inward extending slot through which an enlarged or thickened edge of shade 16 is installed. As best shown in FIG. 4, when roll tube bearing axle 38 is installed within roll tube 44, axle post 42 extends through inner sleeve bore 32. In this way, inner sleeve 28 acts as a bearing for roll tube 44. When shade 16 is fully rolled onto roll tube 44 it substantially fills the annular gap that exists between the roll tube and the inside of housing 20.

Since shade panel 16 is made of a flexible material, in order to retract it into housing 20 a rotational biasing is required. This is fulfilled through the use of a flat so-called "motor" type spring 46. Spring 46 is a flat band of spring steel material wound onto itself. Motor spring 46 at its inner end forms a tab which engages with a elongated slot 47 of roll tube bearing axle post 42. Motor spring 46 is restrained within motor spring cap or housing 48 having a closed end 50 with bore 52 and three projecting legs 54, each having an outwardly directed ramped tooth 56. Motor spring housing 48 acts to restrain motor spring 46 which is wound into the housing. When motor spring 46 is installed within motor spring housing 48 the assembly can be snapped into position onto inner sleeve end 51 by passing legs 54 through apertures 58 within inner sleeve 28 until ramped teeth 56 lock it into position.

Outer sleeve 60 fits over inner sleeve 28 and includes end surface 62 and open end 64. Compression spring 66 is installed over roll tube bearing axle post 42 and urges outer sleeve 60 in an axially displaced outer position (i.e. away from roll tube 44). Outer sleeve 60 is preferably made of a injection molded polymeric material.

Adjustment lever 70 is mounted within outer sleeve 60 and pivots about pin 72 through an angular arcuate range. Adjustment lever spring 74 is a torsion spring which acts on adjustment lever 70 and outer sleeve 60 to urge adjustment lever 70 in the clockwise orientation, with respect to the orientation of the components shown in FIG. 4. One end of adjustment lever 70 forms actuation button 78 which protrudes from outer sleeve lever aperture 80. The opposite end of adjustment lever 70 forms pawl 82 which engages with teeth 36 of rack 34.

Outer sleeve open end 64 is dimensioned such that it can be installed over inner sleeve 28. Outer sleeve slot 63 is provided through which one of rivets 30 (or another fastener) is installed. The fastener interferes with the ends of slot 63 to limit the axial range of motion of outer sleeve 60 and retain the part in an assembled condition.

Outer sleeve end surface 62 features protruding post 84 which is received within socket 86 in the rear quarter compartment trim panel 26 when the shade assembly is installed as shown in FIGS. 1 and 4.

Shade assembly 10 could include an identical end piece assembly 22 at its opposite axial end with minor design changes needed to function from that side of the vehicle. Inner sleeve 28, roll tube bearing axle 38, motor spring housing 48, compressing spring 66, and lever 70 are adapted to be used at either the left-hand or right-hand side of the vehicle. The only unique part for use at the opposite side being outer sleeve 60. Motor spring 46 would be wound to exert a torsional force in the same direction at both axial ends. In an alternate embodiment, a simplified version of end piece assembly 22 could be provided which does not have the axial telescoping feature explained below, depending on the application intended.

When the user desires to remove shade assembly 10 from its installed position as shown in FIGS. 1 and 4, actuation button 78 is depressed which disengages pawl 82 from teeth 36 and outer sleeve 60 is urged inwardly toward the center of the vehicle thus compressing spring 66 and pulling post 84 from its engagement with socket 86. Installation proceeds in the opposite manner.

As mentioned previously, build variations are present in motor vehicles and thus the lateral dimension between sockets 86 at the left-hand and right-hand sides of the vehicle will vary. When shade assembly 10 is in its installed position, pawl 82 will engage one of teeth 36, thus blocking inward movement of outer sleeve 60. The provision of multiple teeth 36 allows a secure locking condition to exist despite body width dimensional variations. Thus, shade assembly 10 is not maintained in its installed position purely through the influence of compression spring 66. Instead it is positively mechanically locked into its installed position making it securely installed in the vehicle. This mechanical engagement enables shade assembly 10 to remain in position despite mechanical and inertial loads (within limits) acting on the assembly.

It is to be understood that the invention is not limited to the exact construction illustrated and described above, but that various changes and modifications may be made without departing from the spirit and scope of the invention as defined in the following claims.

We Claim:

1. A security shade assembly for a motor vehicle adapted to be installed within said motor vehicle and removably mounted to a pair of separated mounting features within a compartment area of said vehicle interior, said shade assembly comprising:

a shade formed of a flexible sheet material, a cylindrical roll tube having an edge of said shade mounted thereto and adapted to enable said shade to be rolled thereon, and at least one end piece assembly affixed to an end of said roll tube and rotationally supporting said roll tube, said assembly including a first end piece component, a torsion spring coupled to said roll tube and said first end piece component thereby rotationally biasing said roll tube, a second end piece component slidably over fitting said first end piece component and moveable axially with respect to said second end piece component from an inner axial position to an outer axial position and having an engagement feature engageable with one of said mounting features to mount said shade assembly, a compression spring acting between said first end piece component and said second end piece component thereby biasing said components axially apart toward said outer position, and latch means including a pawl engageable with a plurality of teeth and biasing means for urging said pawl into engagement with said teeth, said latch means for allowing said second end piece component to move axially away from said first end piece component toward said outer position under the influence of said compression spring and latching said second end piece component at a plurality of relative axial positions where movement of said second end piece component toward said inner axial position is blocked through encagement between said pawl and said teeth, said latch means being disengageable through disengagement between said pawl and said teeth to allow unblocked movement of said second end piece component toward said inner position, said end piece assembly allowing said shade assembly to be mounted between said mounting features with said second end piece component blocked thereby mounting said assembly despite variations in the separation distance between said mounting features.

2. A security shade assembly according to claim 1 further comprising a housing extending axially and enclosing said roll tube.

3. A security shade assembly according to claim 1 wherein said assembly comprises a pair of said end piece assemblies with one of said assemblies affixed to each axial end of said roll tube.

4. A security shade assembly according to claim 1 further comprising said torsion spring in the form of a motor type spring.

5. A security shade assembly according to claim 4 further comprising a spring housing receiving said motor type spring and affixed to said first end piece component.

6. A security shade assembly according to claim I wherein said compression spring is a coil spring.

7. A security shade assembly according to claim 1 wherein said engagement feature comprising a post projecting axially outwardly from said second end piece component and said mounting feature comprising a socket receiving said engagement feature.

8. A security shade assembly for a motor vehicle adapted to be installed within said motor vehicle and removably mounted to a pair of separated mounting features within a compartment area of said vehicle interior, said shade assembly comprising;

a shade formed of a flexible sheet material, a cylindrical roll tube having an edge of said shade mounted thereto and adapted to enable said shade to be rolled thereon, a housing enclosing said roll tube, and at least one end piece assembly affixed to an end of said roll tube and rotationally supporting said roll tube, said end piece assembly including a roll tube bearing axle being received within an end of said roll tube and having a projecting axle post, an inner sleeve affixed to said housing and forming a plurality of projecting teeth and forming an axle bore receiving said axle post and rotatable supporting said roll tube, a spring housing affixed to said inner sleeve, a torsion spring mounted within said spring housing and coupled to said roll tube and said inner sleeve thereby rotationally biasing said roll tube, an outer sleeve slidably overfitting said inner sleeve and moveable axially with respect to said outer sleeve from an inner axial position to an outer axial position and having an engagement feature engageable with said mounting feature to mount said security shade assembly, a compression spring acting between said inner sleeve and said outer sleeve thereby biasing said sleeves axially apart toward said outer position, and a latch for allowing said outer sleeve to move axially away from said inner sleeve toward said outer position under the influence of said compression spring and latching said outer sleeve at a plurality of relative axial positions where movement of said outer sleeve toward said inner axial position is blocked, said lever having a button and a pawl, said lever mounted pivotally to said second sleeve, said pawl engageable with said teeth, spring biasing means for urging said pawl into engagement with said teeth to thereby block said second sleeve from moving to said inner position and actuation of said button causing said pawl to disengage said teeth and thereby unblocking said second sleeve said end piece assembly allowing said shade assembly to be mounted between said mounting features with said outer sleeve blocked thereby securely mounting said shade assembly despite variations in the separation distance between said mounting features.

9. A security shade assembly according to claim 8 wherein said assembly comprises a pair of said end piece assemblies with one of said assemblies affixed to each axial end of said roll tube.

10. A security shade assembly according to claim 8 further comprising said torsion spring in the form of a motor type spring.

11. A security shade assembly according to claim 8 wherein said engagement feature comprising a post projecting axially outwardly from said outer sLiive and said mounting feature comprising a socket receiving said engagement feature.

* * * * *